United States Patent [19]

Tanahashi et al.

[11] Patent Number: 4,533,576
[45] Date of Patent: Aug. 6, 1985

[54] COMPOSITE MATERIAL FOR PACKAGING CONTAINERS

[75] Inventors: Toshifumi Tanahashi, Yokohama; Senji Itoh, Ayase, both of Japan

[73] Assignee: Toyo Seikan Kaisha Limited, Tokyo, Japan

[21] Appl. No.: 519,812

[22] Filed: Aug. 3, 1983

[30] Foreign Application Priority Data

Aug. 6, 1982 [JP] Japan .................. 57-136348

[51] Int. Cl.³ .............................. B32B 27/36
[52] U.S. Cl. ............................. 428/35; 428/327;
428/336; 428/412; 428/458; 428/461;
428/475.2; 428/476.1; 428/463; 428/309.9;
426/127; 206/484.2; 206/524.1; 206/828; 220/1
BC; 220/1 S; 220/419; 220/468; 229/93;
229/1.5 B; 229/3.5 MF
[58] Field of Search ............. 428/35, 412, 336, 327,
428/458, 461

[56] References Cited

U.S. PATENT DOCUMENTS

| 4,397,916 | 8/1983 | Nagano | 428/461 |
| 4,407,893 | 10/1983 | Malizio | 428/461 |
| 4,416,944 | 11/1983 | Adur | 428/475.8 |

*Primary Examiner*—Patricia C. Ives
*Attorney, Agent, or Firm*—Wenderoth, Lind & Ponack

[57] ABSTRACT

A composite material for packaging containers which has excellent sealability, easy openability and excellent flavor-retaining property is provided. The composite material consists of a metallic foil and a thermoplastic resin selected from the group consisting of polyolefinic resins, polyester resins, polyamide resins, polycarbonate resins and mixtures thereof, said thermoplastic resin layer having a thickness of 1 to 20 microns and a surface roughness of not more than 4.0 μm Rmax L0.80 mm. The thermoplastic resin has a carbonyl concentration of 1 to 600 milliequivalents/100 g of resin for the polyolefinic resins, 1,000 to 1,300 milliequivalents/100 g of resin for the polyester resins, 500 to 1,200 milliequivalents/100 g of resin for the polyamide resins and 600 to 800 milliequivalents/100 g of resin for the polycarbonate resins.

12 Claims, 10 Drawing Figures

COMPOSITE MATERIAL FOR PACKAGING CONTAINERS

BACKGROUND OF THE INVENTION

This invention relates to excellent composite materials for containers having excellent flavor-retaining property, excellent sealability and easy openability. More specifically, this invention relates to composite materials for packaging containers, for example composite materials used as packing materials for caps of glass bottles, polyethylene terephthalate (to be referred to as PET) bottles and metallic cans, composite materials for closures used in cups such as plastic cups and paper cups, composite materials for closures of straw-inserting holes of plastic standing pouches, composite materials for closures of composite containers, and composite materials for can bodies.

To secure accurate sealability, conventional caps for packaging containers are equipped with a packing material obtained by providing a cushioning material such as foamed polyethylene sheet on the inside surfaces of such caps as desired, and laminating thereto a single or a composite material such as a polyethylene film, a PET film, a film of a partially saponified ethylene/vinyl acetate copolymer, an aluminum foil, etc. (see, for example, Japanese Laid-Open Patent Publication Nos. 148687/1979 and 148688/1979). Composite materials composed of an aluminum foil and polyethylene, etc. laminated thereto have been used in heat-sealable closures of plastic cups or polyethylene-coated paper cups for packaging puddings, wines and liquors. Since, however, conventional materials do not have entirely satisfactory sealability as packing materials for caps of packaging containers, leakage of carbon dioxide gas occurs frequently. In the case of using such materials in hot packs, air comes into the containers which are under reduced pressure, and causes degeneration of the contents. When these materials are used in the cups, their excessively high heat seal strength makes it difficult to open the containers. It has therefore been desired to secure easy openability. But since improving the openability has resulted in reduced sealability, no entirely satisfactory means has been discovered for providing good sealability and easy openability simultaneously. Furthermore, plastic materials such as polypropylene as composite materials for composite can bodies have poor gas-barrier property, and attempts have been made to improve their gas-barrier properties by lamination of a material having gas-barrier property. But such a laminated material has the defect of being poor in closure sealability.

BRIEF SUMMARY OF THE INVENTION

It is an object of this invention to remove the above defects of the prior art, and to provide a composite material for packaging containers, which has excellent sealability and flavor-retaining property and at the same time, easy openability.

According to this invention, there is provided a composite material for packaging containers, said composite material consisting of metallic foil and a thermoplastic resin selected from the group consisting of polyolefinic resins, polyester resins, polyamide resins, polycarbonate resins and mixtures thereof, said thermoplastic resin layer having a thickness of 1 to 20 microns and a surface roughness of not more than 4.0 $\mu$m Rmax L0.80 mm, said thermoplastic resin having a carbonyl concentration of 1 to 600 milliequivalents/100 g of resin for the polyolefinic resins, 1,000 to 1,300 milliequivalents/100 g of resin for the polyester resins, 500 to 1,200 milliequivalents/100 g of resin for the polyamide resins and 600 to 800 milliequivalents/100 g of resin for the polycarbonate resins.

BRIEF DESCRIPTION OF THE ACCOMPANYING DRAWINGS

DETAILED DESCRIPTION OF THE INVENTION

Figure 1:
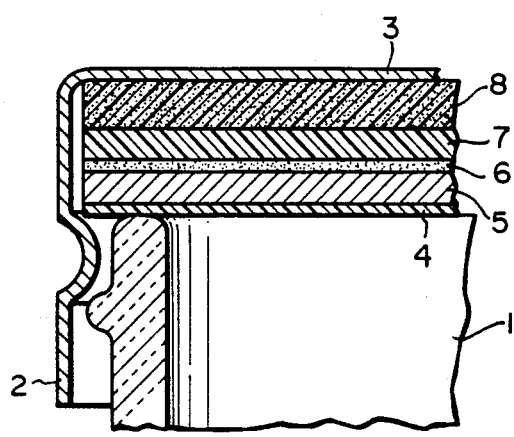
FIG. 1 is a partial sectional view of a bottle mouth sealed with a cap.

The composite material for packaging containers in accordance with this invention has excellent sealability and easy operability as compared with conventional materials, and possesses excellent performance in flavor-retaining property. The present invention thus provides novel composite materials which have some advantages not seen in the conventional materials when they are used as materials for packaging containers such as food packaging containers.

The packaging container for which the composite materials of this invention are conveniently used include, for example, glass bottles, PET bottles and metallic cans for holding foods, chemicals, insecticides, medicines and cosmetics, preferably foods, and plastic cups and polyethylene-coated paper cups for holding such foods as puddings, yogurt, sake and jelly. The composite materials of this invention have also been found to be suitable for use in closures of straw-inserting holes of standing pouches for juices, soups and stews. The composite materials of this invention are also very suitable for closures and can bodies of composite containers which are expected to be substitutes for cans for juices, etc. which, whose after use, now cause environmental pollution. The composite materials of this invention are particularly suitable for packing materials of caps, and can bodies of composite containers.

Examples of the metallic foil used in the composite material of this invention include foils of aluminum, iron, steel, tin and tin plate, and the aluminum foil is preferred. The metallic foil has a thickness of 5 to 100 microns, preferably 9 to 50 microns. The aluminum foil may be one which has been subjected to a surface treatment such as treatment with phosphoric acid or phosphoric acid-chromic acid. The iron foil may be subjected to a surface treatment such as treatment with chromic acid, or plating with zinc, tin and nickel.

When the metallic foil is relatively thin with a thickness of about 7 to 15 microns, its one surface may be reinforced by laminating a film of PET, etc. thereto.

Thermoplastic resins used in the composite materials of this invention are polyolefinic resins such as polypropylene resins and polyethylene resins, polyester resins, polyamide resins and polycarbonate resins. Of these, the polyolefin resins and polyester resins are preferred. These resins may be used in combination with each other.

The thermoplastic resins have the following carbonyl concentrations. The polyolefinic resins have a carbonyl concentration of 1 to 600 milliequivalents, preferably 1 to 300 milliequivalents, especially preferably 1 to 200 milliequivalents, per 100 g of resin. If it is smaller than 1 milliequivalent/100 g of resin, the adhesion between the metallic foil and the thermoplastic resin is reduced, and the sealability of the composite material is reduced. On the other hand, when it exceeds 600 milliequivalents/100 g of resin, no particularly good effect is produced. The polyester resins have a carbonyl concentration of 1,000 to 1,300 milliequivalents, preferably 1,000 to 1,200 milliequivalents, especially preferably 1,000 to 1,150 milliequivalents, per 100 g of resin. If it is lower than 1,000 milliequivalents/100 g of resin, the adhesion between the metallic foil and the thermoplastic resin layer and the sealability of the composite material are reduced undesirably. On the other hand, when it exceeds 1,300 milliequivalents/100 g of resin, no particularly good effect is produced. The polyamide resins have a carbonyl concentration of 500 to 1,200 milliequivalents, preferably 500 to 1,000 milliequivalents, especially preferably 500 to 900 milliequivalents, per 100 g of resin. If it is less than 500 milliequivalents/100 g of resin, the adhesion between the metallic foil and the thermoplastic resin layer and the sealability of the composite material are reduced undesirably. On the other hand, no particularly good effect is obtained when the carbonyl concentration exceeds 1,200 milliequivalents/100 g of resin. The polycarbonate resins have a carbonyl concentration of 600 to 800 milliequivalents, preferably 650 to 800 milliequivalents, especially preferably 700 to 750 milliequivalents, per 100 g of resin. If it is less than 600 milliequivalents/100 g of resin, the adhesion between the metallic foil and the thermoplastic resin layer and the sealability of the composite material are reduced undesirably. On the other hand, when it exceeds 800 milliequivalents/100 g of resin, no particularly good effect can be obtained.

Examples of the polyolefin resins used in the composite materials of this invention are polypropylene and polyethylene resins. The polypropylene resins are especially preferred. These polyolefin resins may be those which are obtained by graft-, block- or random-copolymerizing an organic acid such as maleic acid, phthalic acid, crotonic acid, itaconic acid, citraconic acid or acrylic acid, the esters or metal salts thereof, or an anhydride such as maleic anhydride, citraconic anhydride or tetrahydrophthalic anhydride. Blends of the aforesaid acid-modified polyolefins and unmodified polyolefin resins can also be suitably used. The polypropylene resins preferably have a Shore hardness D of more than 65 and up to 75. If their Shore hardness is less than 65, the resin film surface is susceptible to injury during molding and processing operations such as punching. When it exceeds 75, microscopic injuries at the joining portion of the container body cannot be covered.

The polyolefinic resin used in the composite material of this invention may be used, as required, in combination with another resin. In particular, when easy openability is required or the composite material is used for straw-inserting holes of standing pouches, the polyolefinic resin is used in combination with another resin. Examples of the other resin are polyester resins, polyamide resin and epoxy resins. Polyester resins having the carbonyl concentration specified hereinabove are preferred. Suitable polyester resins are homopolymers or copolymers obtained by polycondensing aromatic or aliphatic dicarboxylic acids such as terephthalic acid, isophthalic acid, adipic acid or sebacic acid as an acid component and at least one diol such as ethylene glycol, propylene glycol, butylene glycol, diethylene glycol, polyethylene glycol, polypropylene glycol, polybutylene glycol and neopentyl glycol as a diol component, and blends of two or more of these polyesters. The proportion of the polyester resin is 40 to 20% by weight for 60 to 80% by weight of the polyolefin resin, preferably 30 to 20% by weight for 70 to 80% of the polyolefin resin. When the proportion of the polyester resin is less than 20% by weight, adhesion to the surface of the polyester resin at the time of heat sealing is undesirably reduced. If it is too much beyond 40% by weight, heat adhesion to the surface of the polyolefin resin at the time of heat sealing is undesirably reduced. When the polyester resin is incorporated in this way, the polyolefin resin used in the composite material of this invention is 1 to 600 milliequivalents/100 g of resin, preferably 1 to 300 milliequivalents/100 g of resin, especially preferably 1 to 200 milliequivalents/100 g of resin. If it is less than 1 milliequivalent/100 g of resin, the adhesion of the resin layer to the metallic foil is undesirably reduced. On the other hand, if it is too high beyond 600 milliequivalents/100 g of resin, no particularly good effect is obtained.

Suitable polyolefinic resins for use in the composite material of this invention have a melt index (MI), determined by the method set forth in JIS K-6758, of 30 to 300, preferably 50 to 250, especially preferably 70 to 220. If the MI is below 30, the degree of permeability of a gas between a glass bottle and a closure increases although no reason has yet been assigned to it. If the MI exceeds 300, the resulting composite material is difficult to fabricate.

The thermoplastic resin layer constituting the composite material of this invention has a thickness of 1 to 20 microns, preferably 2 to 10 microns, especially preferably 3 to 5 microns. If it is less than 1 micron, pinholes tend to form in the resin layer. This causes corrosion of the metallic foil and also reduces the sealability of the composite material. If, on the other hand, the thickness exceeds 20 microns, the amount of a gas permeated undesirably increases.

The thermoplastic resin layer has a surface roughness of not more than 4.0, preferably not more than 3.0, especially preferably not more than 2.7 $\mu$m Rmax L0.80 mm. If the surface roughness exceeds 4.0 $\mu$m Rmax L0.80 mm, the sealability of the composite material is undesirably reduced.

The metal foil and the thermoplastic resin layer in the composite material of this invention may be laminated through a suitable adhesive layer such as a polyurethane layer interposed therebetween. To obtain a good surface roughness, the laminating method in accordance with the invention of the present inventors disclosed in Japanese Patent Application No. 18886/1982. According to this method, particles of a thermoplastic synthetic resin are coated on the surface of the metallic foil, then the particles are softened or melted by high-frequency induction heating, and thereafter the coated surface is rolled by a roll.

The composite material of this invention may be used singly. Usually, however, it is used as a laminated structure with another material such as a plastic foamed sheet, another plastic film or paper, if desired through an adhesive interlayer. As required, a coated layer may be formed on the composite material by coating.

A specific application of the composite material of this invention is described below. FIG. 1 shows an example in which the composite material of the invention is used in a cap for a bottle such as a glass bottle and a PET bottle. In the drawing, the reference numeral 1 represents a bottle mouth portion; 2, a skirt portion of a cap; 3, a top panel portion of the cap; 4, a polypropylene resin layer; 5, an aluminum foil layer; 6, an adhesive layer; 7, a polyethylene film layer; and 8, a foamed polyethylene sheet layer. The composite material of this invention is composed of the layers 4 and 5, and in this example, a packing material is produced by laminating the polyethylene film layer 7 and the foamed polyethylene sheet layer 8 to the composite material through the adhesive layer 6. By dint of this packing material, the cap has a good ability to seal the bottle mouth and good flavor-retaining characteristics.

Figure 2:
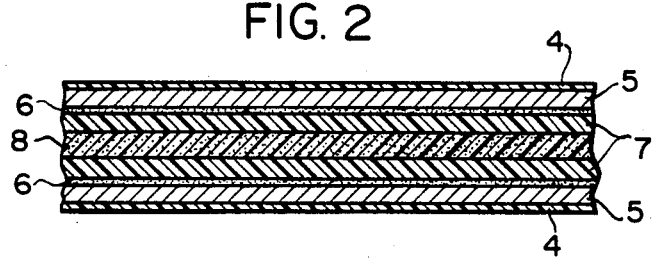
FIG. 2 is a sectional view of a laminate obtained by applying the composite material of the invention.

Another example of the composite material of this invention used for a bottle cap is shown in FIG. 2. The composite material shown in FIG. 2 is used in the same way as the composite material shown in FIG. 1. In the drawing, the reference numeral 4 represents a polypropylene resin layer; 5, an aluminum foil layer; 6, an adhesive layer; 7, a polyethylene film layer; and 8, a foamed polyethylene sheet layer. The composite material of this invention corresponds to two upper and lower sets of the layers 4 and 5.

Figure 4:
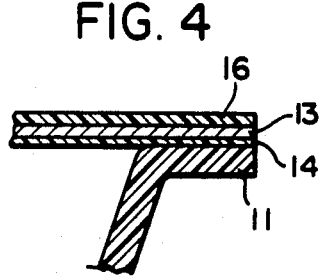
FIGS. 4 to 6 are enlarged sectional views of the sealing portions of packed cup-shaped containers.
Figure 5:
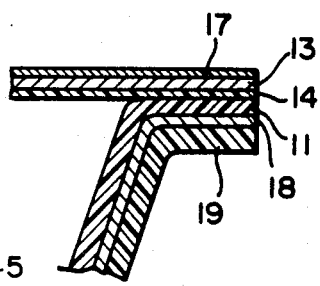
Figure 3:
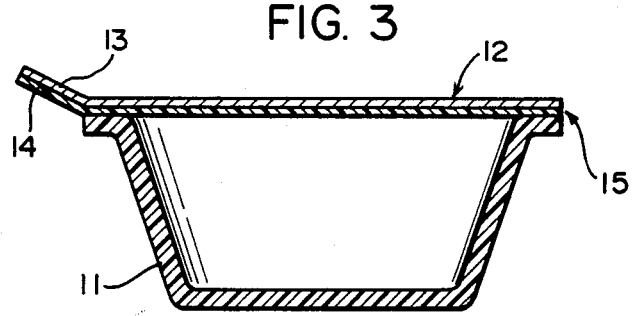
FIG. 3 is a sectional view of a packed cup-shaped container.
Figure 6:
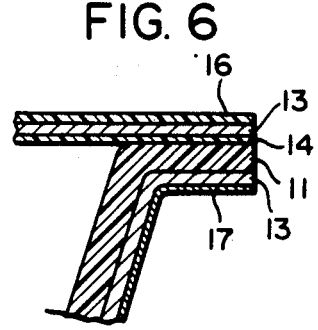

In an example of application of the composite material to a cup as shown in FIG. 3, the composite material of this invention composed of an aluminum foil 13 and a polypropylene layer 14 is suitably used when a closure 12 is heat-sealed to a polypropylene layer 11 of the cup body at a joint portion 15. Other examples of application to such a use are shown in FIGS. 4 to 6 which are enlarged views of joint portions corresponding to the joint portion 15 in FIG. 3. In these drawings, the reference numeral 13 represents an aluminum foil; 14, a polypropylene resin layer; 16, a PET layer; 17, a coated film layer; 18, an ethylene/vinyl alcohol copolymer layer (Eval); and 19, a polypropylene layer.

Figure 7:
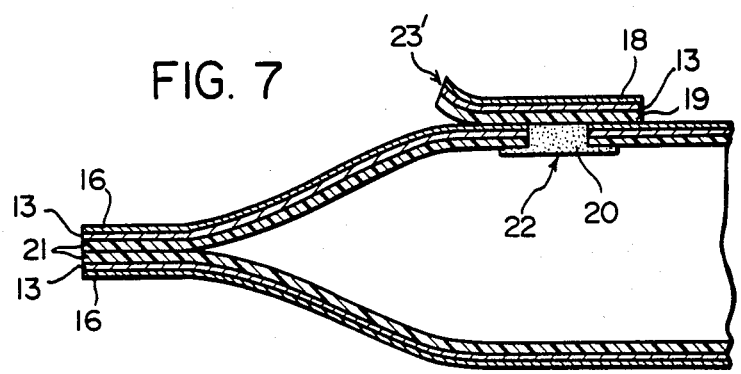
FIG. 7 is a sectional view of a standing pouch.

An example of using the composite material of this invention in a standing pouch is shown in FIG. 7. In a standing pouch composed of a laminate of a polypropylene layer 21, an aluminum foil layer 13, and a PET layer 16, a straw-inserting hole 22 is heat-sealed by a polyproylene liner film 20, and a laminate (closure) consisting of a composite material of this invention composed of an aluminum foil 13 and a blend resin layer 19 composed of 80% of maleic acid-modified polypropylene and 20% of modified polyester, and a PET or coated film layer 18. The pouch can be easily opened by pulling a tab 23.

Figure 8:
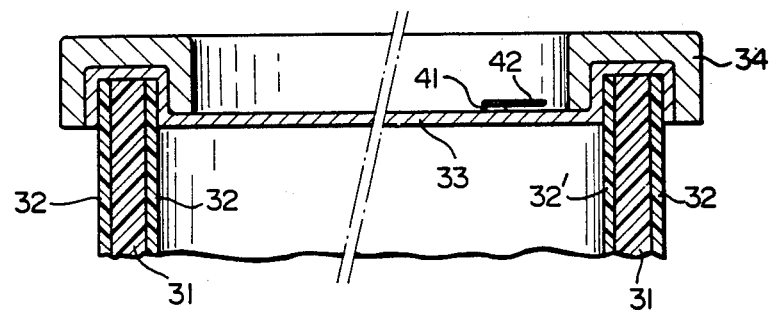
FIG. 8 is a sectional view of a composite container composed of a body end portion, a closure laminate material and a sealing ring.
Figure 9:
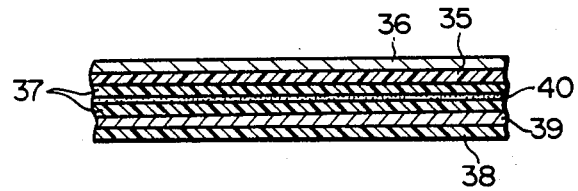
FIG. 9 is an enlarged sectional view of the aforesaid laminate material for closures.
Figure 10:
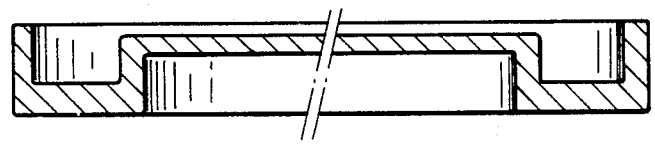
FIG. 10 is a sectional view of a molded sealing material for sealing the body end portion of the bottom surface of the composite container shown in FIG. 9.

Examples of the application of the composite material of this invention to closures and/or bodies of composite container are shown in FIGS. 8 to 10. The composite containers supersede can containers for beverages which now cause an environmental problem when after use, are thrown away. Composite containers are suitable for packing foods, and as required, can be hot-packed, retorted, and aseptically filled. Layers 31, 32 and 32' are integrated to form the body of a composite container. When the composite material of this invention is used only as a closure 33, the body of the container is, for example, a laminate composed of an outermost layer 32 of thermoplastic resin, an innermost layer 32' of thermoplastic resin, and a layer of paper, a metal or resin as an interlayer 31. For example, the layers 32 and 32' are olefinic resin layers, and the layer 31 is a laminate of aluminum-polyolefin-paper or a laminate of iron-PET-polyolefin-paper. Sometimes, the layer 32 is a polyester layer, the layer 32' is a polyolefin layer, and the layer 31 is an aluminum-polyolefin layer. The reference numeral 33 represents a laminated material as shown in FIG. 9, and the reference numeral 34 represents a sealing ring made of polyolefin. FIG. 9 is an enlarged sectional view of the laminate material 33 composed of an outside layer 36 of a modified polyolefin, aluminum foils 35 and 39, a layer 37 of PET, paper or another film, a urethane adhesive layer 40, and an inside layer 38 of a modified polyolefin to which a polyolefin layer is further laminated on the innermost side. The composite material of this invention is used in the laminated portions shown by 35 and 36 and the laminated portions 39 and 38 in FIG. 9.

When the composite material of this invention is used in the body of the container, it is a laminate of modified polyolefin-aluminum-polyester which is disposed as the outermost layer 32 of the body so that the modified polyolefin layer contacts the interlayer 31. In this embodiment, a laminate of a polyolefin and aluminum, for example, is generally used as the closure 33.

The composite material of this invention may be used both in the closure and body of a composite container.

Sealing of the composite container in the above embodiment is effected by melt-adhering the polyolefin resin layer by heating the metallic foil in the fitting portion between the closure and the body of the container by high-frequency induction heating.

The following Examples illustrate the present invention more specifically.

EXAMPLE 1

One surface of an aluminum foil having a thickness of 30 microns and moving continuously at a speed of 4.5 m/min. was coated by an electrostatic spay gun with a powder of maleic anhydride-modified polypropylene resin having a weight average particle diameter of 40 microns, an MI of 50 g/10 min., an average carbonyl group concentration of 7 milliequivalents/100 g of resin, a melting point of 159° C. and a Shore hardness D of 66 at a rate of 4.4 g/m$^2$. The discharge pressure was 1.1 kg/cm$^2$ and the voltage applied was 90 KV.

The high-frequency output of a high-frequency induction heating coil disposed at a distance of 1.5 cm from the coated surface of the moving aluminum foil was adjusted to 0.62 KW, and the aluminum foil coated with the modified polypropylene resin powder was heated for 1 second to melt the coated powder. While being maintained in this state, the powder-coated aluminum foil was rolled under a pressure of 6 kg/cm$^2$ between a hot roll having a diameter of 120 mm and kept at a temperature of 200° C. and a Teflon-coated roll having a diameter of 80 mm whose surface was cooled to 80° C. by a cooling roll having a diameter of 60 mm so that the powder-coated surface of the aluminum foil contacted the Teflon-coated roll. The high frequency induction heating and the rolling by the hot roll, the rolling roll and the cooling roll were further carried out successively two times.

Then, the resin-coated aluminum foil was cooled to 20° C. by a roller pair consisting of a cooling roll and a rubber roll to give a resin-coated aluminum foil which was thin and had a creaseless smooth surface. The total time of heating by high frequency induction heating and heating by the hot roll was 3.7 seconds.

A low density polyethylene film having a thickness of 30 microns was bonded to the non-coated surface of the aluminum foil by means of a urethane-type adhesive. A foamed polyethylene sheet having a thickness of 2 mm was laminated to the polyethylene film side of the laminate by using a urethane-type adhesive.

The resulting laminate was punched out by a punch and bonded to an aluminum cap having a diameter of 28 mm so that the polypropylene coated layer of the laminate faced that side which would contact an article to be filled in a container (see FIG. 1).

The aluminum cap described above was put over a bottle having a total capacity of 110 ml filled with 20 ml of a 50% aqueous solution of ethyl alcohol and seamed by a sealing machine to form a sample bottle. The bottle was put in a desiccator filled with an atmosphere of p-dichlorobenzene and maintained stationary in an upright position. It was maintained at a constant temperature of 40° C., and the sample bottle was taken out 8 days later. The amount of p-dichlorobenzene migrated to the ethyl alcohol solution was measured by gas chromatography.

Another bottle was filled with 50% orange juice, and sealed up in the same way. It was stored at 50° C. for one month, and the deterioration of the flavor of the juice, the durable pressure reduction resistance of the bottle and the corrosion of the aluminum foil were examined.

Separately, the surface roughness of the maleic acid-modified polypropylene layer of the above cap was measured in accordance with the method of JIS B-601 by using a surface roughness shape measuring apparatus (Surfcom 400 Ω, made by Tokyo Seimitsu Co., Ltd.).

The Shore hardness D of the cap packing material was measured in accordance with ASTM D2240 23-C.

The results are shown in Table 1.

EXAMPLES 2 TO 6 AND COMPARATIVE EXAMPLES 1 TO 4

Example 1 was repeated except that the surface roughness, MI, carbonyl group concentration, average film thickness and Shore hardness D were changed as shown in Table 1. The surface roughness was changed by changing the surface contact angle of the film with respect to the rolling roll. The results are also shown in Table 1.

TABLE 1

| | Thermoplastic resin | | | Resin layer | | Results | | | |
|---|---|---|---|---|---|---|---|---|---|
| Experiment No. | MI (g/10 min.) | Carbonyl group concentration (meq/100 g) | Shore D hardness*4 | Average coating thickness ($\mu$) | Surface roughness ($\mu$m Rmax L 0.80 mm) | Amount of p-dichlorobenzene permeated (ppb) | Flavor of orange juice*1 | Corrosion of aluminum foil*2 | Durable pressure reduction resistance (mmHg)*3 |
| Example 1 | 50 | 8.0 | 66 | 4.8 | 0.62 | 0.4 | 95 | ⊚ | 44.5 |
| Example 2 | 50 | 8.0 | 66 | 4.7 | 3.55 | 2.0 | 80 | ⊚ | 35.2 |
| Example 3 | 50 | 8.0 | 66 | 11.0 | 3.43 | 3.5 | 75 | ⊚ | 37.4 |
| Example 4 | 210 | 9.5 | 67 | 4.1 | 2.62 | 1.1 | 98 | ⊚ | 43.8 |
| Example 5 | 50 | 8.0 | 66 | 5.7 | 3.73 | 4.2 | 88 | ⊚ | 32.7 |
| Example 6 | 100 | 20.3 | 67 | 4.9 | 2.50 | 0.7 | 96 | ⊚ | 43.5 |
| Comparative Example 1 | 50 | 8.0 | 66 | 4.8 | 4.21 | 9.3 | 47 | ⊚ | 20.6 |
| Comparative Example 2 | 50 | 8.0 | 66 | 0.8 | 1.50 | 1.2 | 50 | Δ | 30.6 |
| Comparative Example 3 | 50 | 0.7 | 66 | 4.7 | 3.61 | 4.1 | 83 | Δ | 39.2 |
| Comparative Example 4 | 50 | 8.0 | 66 | 22.0 | 3.65 | 13.5 | 92 | ⊚ | 36.1 |

NOTE:
*1The total points assigned by 20 panelists, in which a very good flavor was 5 points, a good flavor 4 points, an ordinary flavor 3 points, a bad flavor 2 points, and a very bad flavor 1 point.
*2Corrosion of the aluminum foil was observed visually, and rated on the scale of ⊚ which means no corrosion, O which means scarcely any corrosion, Δ which means a little corrosion, and X which means the occurrence of corrosion.
*3Measured in accordance with JIS-9017
*4Measured in accordance with ASTM D2240, 23-C.

EXAMPLE 7

An aluminum foil having a thickness of 100 microns was coated with a powder of a copolyester (terephthalic acid/isophthalic acid=7/3, ethylene glycol/butylene glycol—6/4) having a weight average particle diameter of 30 microns, a number average molecular weight of about 10,000, a specific gravity of 1.3, and an average carbonyl group concentration of 1010 milliequivalents/100 g of resin at a rate of 5 g/m$^2$ in the same way as in Example 1. The coated powder on the aluminum foil was melted by high-frequency induction heating and rolled in the same way as in Example 1 to obtain a laminate (I) composed of a polyester layer having an average film thickness of 3.9 microns and an aluminum foil having a thickness of 100 microns. The surface roughness of the copolyester layer was 2.0 $\mu$m Rmax L0.80 mm.

Separately, a cup having a thickness of 1 mm, a diameter of 50 mm, a depth of 150 mm and a flange width of 10 mm was molded from a polyethylene terephthalate resin having a number average molecular weight of about 20,000. The cup was sterilized with hydrogen peroxide. Sterilized coffee was filled in the sterilized polyethylene terephthalate cup. The laminate I sterilized with hydrogen peroxide was punched out into a circular shape having a diameter of 70 mm with the formation of a tab having a length of about 20 mm. The copolyester layer of the laminate was laid in contact with the flange portion of the polyethylene terephthalate cup, and bonded under heat and a pressure of 3 kg/cm² to seal up the cup (see FIG. 3). The cup was then left to stand at room temperature for 2 months, and then opened by pulling the tab. It could be easily opened without fluffing or feathering. The coffee therein tasted good. No corrosion of the aluminum foil nor delamination between the copolyester layer and the aluminum foil was observed.

EXAMPLE 8

A polyethylene terephthalate bottle having an outside diameter of 80 mm, a height of 280 mm, an inner mouth diameter of 20 mm and a wall thickness of 3 mm was injection blow-molded.

Separately, a 12 micron-thick polyethylene terephthalate film and a 9 micron-thick aluminum foil were laminated to each other by means of a urethane-type adhesive. A powder of a copolyester resin (terephthalic acid/adipic acid=6/4, ethylene glycol/diethylene glycol=9/1) having an average carbonyl group concentration of 1,110 milliequivalents/100 g of resin and a number average molecular weight of about 10,000 and a weight average particle diameter of 30 microns was electrostatically coated on the aluminum foil of the laminate at a rate of 5.0 g/m² in the same way as in Example 1, melted by high-frequency induction heating, and rolled by a rolling roll. The polyester layer had a thickness of 3.8 microns, and a surface roughness of 1.0 μm Rmax L0.80 mm. The resulting composite material was punched into a circular shape having a diameter of 26 mm.

100% Natural orange juice was filled while hot into the polyethylene terephthalate bottle. The punched closure material was laid on top of the bottle so that the rolled polyester layer contacted the end surface of the mouth of the bottle. The assembly was heat-sealed at 250° C. and 3 kg/cm² for one second. The heat-sealed cup was left to stand at room temperature for 3 months. No decrease was seen in the degree of pressure reduction inside the cup by the intrusion of the outer air from the sealed portion. When the heat-sealed closure was pulled up, the cup could be opened well without fluffing or feathering. Corrosion of the aluminum foil of the composite material, the change of the color of the orange juice and the deterioration of its flavor were not observed, and the orange juice tasted good.

EXAMPLE 9

A cup having a wall thickness of about 1 mm, a top inside diameter of 80 mm, a bottom inside diameter of 60 mm, a depth of 4 mm and a flange width of 10 mm with the shape shown in FIG. 3 was produced by injection molding from nylon 12 having a number average molecular weight of about 20,000 and a melting point of about 185° C.

The same modified polypropylene powder as used in Example 1 was coated to a final thickness of 4.5 microns on an aluminum foil having a thickness of 100 microns, and a modified polypropylene/aluminum foil laminate was obtained in the same way as in Example 1. It has a surface roughness of 1.85 μm Rmax L0.80 mm.

Pudding was filled in the cup, and the above laminate punched out into a circular shape having a diameter of 100 mm with a tab having a size of 10 mm×20 mm was laid on top of the flange portion of the cup with the modified polypropylene layer facing inwardly. The assembly was heat-bonded at 250° C. and 3 kg/cm² for 3 seconds.

When the sealed cup was retorted at 120° C. for 30 minutes, no peeling or leakage from the bonded part was observed. It was stored at room temperature for one month, and opened by pulling the tab portion. It could be opened easily without fluffing or feathering, and the pudding tasted good.

EXAMPLE 10

A biaxially stretched polyethylene terephthalate film having a thickness of 12 microns, an aluminum foil having a thickness of 9 microns, and a polypropylene film having a thickness of 70 microns were bonded in this order by means of a urethane-type adhesive, and the laminate (laminate I) was cut into a piece having a size of 130×170 mm. At the center of this laminate 1, a straw-inserting hole having a diameter of 10 mm was formed.

Separately, an aluminum foil having a thickness of 30 microns was coated with an 8:2 mixture of the same maleic acid-modified polypropylene powder as used in Example 1 and a powder of a copolyester (terephthalic acid/adipic acid=5/5, ethylene glycol/butylene glycol/diethylene glycol=8/1/1) having an average carbonyl group concentration of 1,150 milliequivalents/100 g of resin, a number average molecular weight of about 10,000 and an average particle diameter of about 40 micron in the same way as in Example 1 at a rate of 4.0 g/m². The mixed powder was melted by high-frequency induction heating, and rolled. The composite material obtained had an average film thickness of 4.1 microns and a surface roughness of 2.63 μm Rmax L0.8 mm.

A biaxially stretched polyethylene terephthalate film having a thickness of 12 microns was laminated to the other surface of the aluminum foil by means of a urethane-type adhesive (laminate II). The laminate II was cut into a piece having a size of 20 mm×35 mm (II'). Then, a polypropylene film having a thickness of 70 microns was cut into a size of 14 mm×30 mm (III). The laminate II' was placed on the polyethylene terephthalate film side of the three-layered laminate I having the straw-inserting hole so as to cover the straw-inserting hole, and the laminate (II') was placed on the polyethylene terephthalate film side of the laminate I. The film piece III was placed on the polypropylene film side. The assembly was heat-bonded at 260° C. and 3 kg/cm² for 2 seconds to form a composite material consisting of the tab material II', the laminate I and the inner polypropylene film III (see FIG. 7).

The laminate I (130 mm×170 mm) having no straw-inserting hole was superimposed on the aforesaid laminate material I having the tab bonded thereto so that the inner polypropylene layers faced each other. The three sides of the assembly were heat-sealed at 260° C. and 3 kg/cm² for one second with a seal width of 10 mm. From the remaining one side, coffee was filled into the container, and this side was heat-sealed, The filled container was retorted at 120° C. for 30 minutes. Defects such as delamination between the tab and the container surface, and fractures in the inner lining material and the tab material were not observed. When one end of the tab was pulled, it could be easily removed from the interface between the tab material and the main body of the container. In addition, only that portion of the inner polypropylene film which corresponded to the straw-inserting hole was peeled off together with the tab material. A clear straw-inserting hole was formed in the main body of the container. When coffee was taken by inserting a straw from the straw-inserting hole, it tasted good.

EXAMPLE 11

An epoxy-phenol lacquer composed mainly of bisphenol A and resol was coated on a chromate-treated steel sheet having a thickness of 300 microns, and baked at 200° C. for 30 minutes.

The lacquered steel sheet was deep-drawn into a cup having a top inside diameter of 60 mm, a bottom inside diameter of 50 mm, a depth of 25 mm and a flange width of 5 mm so that the lacquered surface became the inside surface of the cup.

A powder of nylon 12 having a weight average particle diameter of 30 microns, an average carbonyl group concentration of 520 milliequivalents/100 g of resin and an average molecular weight of about 10,000 was coated on the unlacquered surface of the 100 micron aluminum foil at a rate of 4.5 g/m$^2$, melted by high-frequency induction heating, and rolled by a rolling roll while it was in the molten state. Thus, an aluminum foil having a nylon coating with an average thickness of 4.4 microns was obtained. The nylon coating had a surface roughness of 1.50 μm Rmax L0.8 mm. The resulting composite material was punched into a circular shape having a diameter of 70 mm with the formation of a tab having a length of 20 mm and a width of 10 mm at one position on the circumference to obtain a closure packing. Sweet bean jelly was filled into the cup, and the closure material was superimposed onto the flange of the cup with the nylon 12 side inward. The assembly was heat-sealed at 270° C. and 3 kg/cm$^2$ for 2 seconds. The cup was then retorted at 120° C. for 30 minutes. No delamination occurred at the sealed portion, and the sealability of the cup was retained. When the tab was pulled, delamination between the nylon-12 layer and the aluminum foil occurred only at the flange portion, and the cup could be opened well without feathering. The jelly tasted good.

EXAMPLE 12

A polypropylene film having a thickness of 50 microns and an aluminum foil having a thickness of 20 microns were bonded to each other by a urethane-type adhesive (laminate I). A polypropylene film was extruded from a T-die and coated on both surfaces of a raw paper for a cup having a basis weight of 220 g/m$^2$ in a thickness of 30 microns and 50 microns, respectively to prepare a laminate (laminate II). Then, the aluminum foil surface of the laminated material I and the 30 micron thick polypropylene surface of the laminate II were bonded to each other by means of a urethane-type adhesive to give a five-layered laminate (III).

Separately, a polyethylene terephthalate film having a thickness of 12 microns and an aluminum foil having a thickness of 20 microns were laminated by means of a urethane-type adhesive. The aluminum foil of the laminate was coated electrostatically with a powder of maleic acid-modified polypropylene resin (obtained by graft polymerization of maleic anhydride) having an MI of 200 g/10 minutes, an average carbonyl group concentration of 12.7 milliequivalents/100 g of resin, a melting point of 158° C. and a weight average particle diameter of 40 microns. at a rate of 4.0 g/m$^2$ in the same way as in Example 1. The resin powder was melted by high-frequency induction heating, and rolled. The modified polypropylene layer had a thickness of 4.4 microns and a surface roughness of 2.90 μm Rmax L0.80 mm. Two such materials were bonded by a urethane-type adhesive so that the polyethylene terephthalate film surfaces joined each other. Thus, there was obtained a six-layered laminate (IV) consisting of maleic acid-modified polypropylene/aluminum foil/polyethylene terephthalate/polyethylene terephthalate/aluminum foil/maleic acid-modified polypropylene.

A piece having a size of 170 mm × 125 mm was cut off from the laminate III, and folded in a cylindrical form with the 125 mm side being in the height direction. The marginal portions of the piece were superimposed with a lap width of 6 mm, and joined by heating at 250° C. and 5 kg/cm$^2$ for 3 seconds to obtain a composite can body having an inside diameter of 52.3 mm.

Separately, the laminate IV was press-formed into the shape shown by the composite material 33 in FIG. 8, and put over one end of the can body as shown in FIG. 8.

A polypropylene sealing ring 34 for closure reinforcement was put further over the press-formed closure material, as shown in FIG. 8, and while applying a pressure to the can end in the horizontal direction, the aluminum foil of the laminate IV was heated by high-frequency induction heating to heat-bond the can body to the laminate 33, and the laminate 33 to the sealing ring 34.

An aluminum pull tab 42 having easy openability had been provided in the closure 25. The tab and the closure were bonded by a modified polypropylene resin 41 which was the same in kind as the closure.

The can was heat-sterilized and coffee was aseptically filled in it. The other open end of the can was sealed up in the same way as described above. After the can was left to stand for three months at room temperature, it was opened by pulling the tab. Coffee therein tasted good.

EXAMPLE 13

(A) A hollow cylindrical article (can body I") having an inside diameter of 52.3 mm, a wall thickness of 1 mm, and a length of 125 mm was produced by extrusion-molding of an ethylene propylene block copolymer having an MI of 2 g/10 minutes, and an ethylene content of 5 moles %, and a melting point of 157° C.

A polyethylene terephthalate film having a thickness of 12 microns and an aluminum foil having a thickness of 9 microns were laminated by means of a urethane-type adhesive to produce a two-layered laminate. The aluminum foil surface of the two-layered laminate was electrostatically coated with a powder of a maleic acid-modified polypropylene having an MI of 250 g/10 minutes, an average carbonyl group concentration of 61 milliequivalents/100 g of resin and a weight average particle diameter of 50 microns at a rate of 2 g/m$^2$ in the same way as in Example 1. The modified polypropylene powder was melted by high-frequency induction heating, and rolled by a rolling roll to obtain a three-layered laminate (II) composed of maleic acid-modified polypropylene layer/aluminum foil and polyethylene terephthalate film. The maleic acid-modified polypropylene resin layer had a thickness of 2.2 microns and a surface roughness of 3.40 μm Rmax L0.8 mm.

The laminate II was heated by high-frequency induction heating to melt the maleic acid-modified polypropylene resin. On the other hand, the can body I' was inserted into a mandrel and with rotation, hot air was applied to its surface to melt only the surface polypropylene layer. The acid-modified polypropylene layer of the laminate II was pressed against the surface of the can body I' to coat the laminate II on the entire surface of the can body I' to produce a coated can body (can body I).

Separately, a 7:3 powdery mixture of the above maleic acid-modified polypropylene and a polyester (terephthalic acid/adipic acid=5/5, ethylene glycol/diethylene glycol=9/1) having an average carbonyl group concentration of 1290 milliequivalents/100 g of resin was electrostatically coated on an aluminum foil having a thickness of 80 microns at a rate of 4.1 g/m² in the same way as in Example 1, melted by high-frequency induction heating, and rolled by a rolling roll. The resin layer had a thickness of 4.0 microns and a surface roughness of 2.5 μm Rmax L0.80 mm. The other surface of the aluminum foil was bonded to an unstretched polypropylene film having a thickness of 30 microns by means of a urethane-type adhesive to produce a laminate III for a closure.

As shown in FIG. 8, the laminate III was press-formed into a shape adapted to be received over the cut end surface of the can body I. A tab for easy opening was bonded to the press-formed piece, and it was fitted over the top end surface of the can body I so that the rolled coating became an inside surface. A sealing ring 34 produced by injection molding of the same polypropylene as that which formed the can body was put over the laminate III. By high-frequency induction heating, the can body and the closure were bonded to each other and the closure was bonded to the sealing ring 34.

A liquid soup was filled in the can, and a closure having no tab was put over the other end of the can body. Furthermore, the injection-molded article shown in FIG. 10 was put over it. By high-frequency induction heating, the can body and the closure were heat-bonded to each other and the closure and the injection-molded articles were also heat-bonded to each other. The bonded can was retorted at 120° C. for 30 minutes. No delamination occurred between the can body and the closure and between the closure and the injection-molded article, and its sealability was retained. After it was left to stand at room temperature for one month, the tab was pulled to open the can. The soup therein tasted good.

(B) A composite container was produced by carrying out the same experiment as in the above procedure of Example 13 except that in the composite container obtained in (A) above, a laminate obtained by laminating a 50 micron-thick polypropylene film to a 100 micron-thick aluminum foil by means of a urethane-type adhesive was used as a material for a closure, and in the composite material of the invention for a can body, an aluminum foil coated with an epoxy-phenol type lacquer and baked was used. When the composite container was tested under the same conditions as in (A) above, similar test results were obtained.

What is claimed is:

1. A composite material for packaging containers, said composite material consisting of a metallic foil and a thermoplastic resin selected from the group consisting of polyolefinic resins, polyester resins, polyamide resins, polycarbonate resins and mixtures thereof, said thermoplastic resin layer having a thickness of 1 to 20 microns and a surface roughness of not more than 4.0 μm Rmax L0.80 mm, said thermoplastic resin having a carbonyl concentration of 1 to 600 milliequivalents/100 g of resin for the polyolefinic resins, 1,000 to 1,300 milliequivalents/100 g of resin for the polyester resins, 500 to 1,200 milliequivalents/100 g of resin for the polyamide resins and 600 to 800 milliequivalents/100 g of resin for the polycarbonate resins.

2. The composite material of claim 1 wherein the thermoplastic resin is a polyolefinic resin.

3. The composite material of claim 2 wherein the polyolefinic resin has an MI of 30 to 300.

4. The composite material of claim 1 wherein the composite material is produced by coating particles of said thermoplastic resin on one surface of the metallic foil, preheating the coating by high-frequency induction heating, and thereafter rolling the coating by a roll.

5. The composite material of claim 1 which is for use in food packaging containers.

6. The composite material of claim 5 which is for use as a packing material for caps.

7. The composite material of claim 5 which is for use as a can body.

8. The composite material of claim 2 wherein the composite material is produced by coating particles of said thermoplastic resin on one surface of the metallic foil, preheating the coating by high-frequency induction heating, and thereafter rolling the coating by a roll.

9. The composite material of claim 3 wherein the composite material is produced by coating particles of said thermoplastic resin on one surface of the metallic foil, preheating the coating by high-frequency induction heating, and thereafter rolling the coating by a roll.

10. The composite material of claim 2 which is for use in food packaging containers.

11. The composite material of claim 3 which is for use in food packaging containers.

12. The composite material of claim 4 which is for use in food packaging containers.

* * * * *